United States Patent [19]
Sugihara et al.

[11] Patent Number: 5,890,699
[45] Date of Patent: Apr. 6, 1999

[54] FLUID FLOW CONTROL ROTARY VALVE

[75] Inventors: Shinji Sugihara, Motosu-gun; Akira Furukawa, Kariya, both of Japan

[73] Assignee: Nippondenso Co., Ltd., Japan

[21] Appl. No.: 774,597

[22] Filed: Dec. 30, 1996

Related U.S. Application Data

[63] Continuation of Ser. No. 530,197, filed as PCT/JP95/00157, Feb. 7, 1995 published as WO95/22023, Aug. 17, 1995, abandoned.

[30] Foreign Application Priority Data

Feb. 10, 1994 [JP] Japan ................................. 6-016594

[51] Int. Cl.$^6$ ........................................................ F16K 5/04
[52] U.S. Cl. ............................................ 251/309; 251/367
[58] Field of Search ............................ 137/876, 625.46; 251/367, 309

[56] References Cited

U.S. PATENT DOCUMENTS 4,494,517  1/1985  Kratt et al. .
5,251,663  10/1993  Christianson et al. ................. 137/876

FOREIGN PATENT DOCUMENTS 53-093733  7/1978  Japan .
57-034424  7/1982  Japan .
61-181166  11/1986  Japan .
4-125668  11/1992  Japan .
5-215051  8/1993  Japan .
6-058145  8/1994  Japan .
6-058146  8/1994  Japan .

*Primary Examiner*—John Fox
*Attorney, Agent, or Firm*—Pillsbury Madison & Sutro, LLP

[57] ABSTRACT

An inner periphery of a housing 1 supports a rotary shaft rotatably via a pair of bearings 3, and a valve body 5 which is secured to the rotary shaft 4 changes at least one opening area of an intake port 19 and an outlet port 14 formed in the inner periphery. A biasing member 25 biases the bearings in a one-way direction. Therefore, the valve body 5 is moved or biased by the biasing member to the inner periphery of the collar 2 via the bearings, thereby decreasing leakage in the valve when closing. Therefore, even if difference of the thermal expansion coefficient between the housing 1 and the valve body 5 is significant, the leakage can be decreased, thus increasing variety of the material choice. In addition, even if the difference of the thermal expansion coefficient between the housing 1 and the ball bearings is significant, the bearings may not become loose due to expansion of the collar 2, therefore the housing may be selected from various kinds of material including resinous material.

6 Claims, 7 Drawing Sheets

(S2)

(S3)

FLUID FLOW CONTROL ROTARY VALVE

This is a continuation of application No. 8/530,197, filed as PCT/JP95/00157 Feb. 7, 1995 published as WO95/22023 Aug. 17, 1995 which was abandoned upon the filing hereof.

TECHNICAL FIELD

The present invention relates to a fluid flow control rotary valve and, preferably, to an intake-air-flow-rate control valve for an internal combustion engine.

DESCRIPTION OF RELATED ART

A fluid flow control rotary valve which has a housing having a valve chamber with an intake port and an outlet port formed at a longitudinally central portion of an inner periphery thereof, a rotary shaft rotatably supported by a pair of bearings and a valve body carried by the rotary shaft and disposed in the valve chamber for changing an opening area of either one of the intake and outlet ports is well known (for instance, Japanese Unexamined Patent Publication Sho 59-150939), which corresponds to U.S. Pat. No. 4,494,517.

However, the above conventional fluid flow control rotary valve has problems as follows.

Firstly, the relative position of the housing and the bearing changes due to difference of the thermal expansion coefficient between the housing and the bearing and clearance between the inner periphery of the housing and the valve body becomes significant, increasing leakage in the valve.

On the other hand, if the difference of the thermal expansion coefficient is intentionally minimized, such material must be selected from a limited number of materials, causing troubles in the cost of production, process, reliability, etc. For instance, if they are made of metal, weight becomes troublesome as compared with resinous material. On the other hand, if they are made of resinous material, reliability becomes troublesome. If the housing is made of resinous material (nylon, for example) and the valve body is made of metal (aluminum alloy or stainless steel), the clearance between the housing and the valve body increases due to the thermal expansion of the housing at high temperature, increasing leakage in the valve.

SUMMARY OF THE INVENTION

The present invention provides a fluid flow control rotary valve which can decrease the leakage due to the thermal expansion difference between the housing and the bearing or the valve body. An object of the present invention is to provide a fluid flow control rotary valve which can decrease leakage without increasing the precision of the manufacturing process.

In order to achieve the above object, a first aspect of the invention provides a fluid flow control rotary valve including a frame member which has a valve chamber with an intake port and an outlet port disposed at a longitudinally central portion on an inner periphery thereof, a rotary shaft rotatably supported by a pair of ball bearings which are fitted into both ends of the inner periphery and a valve body carried by the rotary shaft and disposed in the chamber for changing the opening area of the ports, and, particularly, including means for biasing the ball bearings against a portion of the inner periphery of the frame member, whereby change of clearance between the valve body and the inner periphery of the frame member due to thermal expansion is restricted.

The inner periphery of the housing supports the rotary shaft via the bearings, and the valve body secured to the rotary shaft changes the opening area of at least one of the intake and outlet ports. The biasing means biases the bearings toward one of the ports.

Therefore, the valve body is biased to move toward the ports and decrease the leakage in the closing valve. As a result, even if materials of the housing and the valve body are selected so that the thermal expansion deference between them becomes significant, the leakage can be decreased, thereby increasing the variety of possible material choices.

Further, the clearance between the inner periphery of the housing and the valve body can be managed with ease, thereby reducing the leakage without increasing the precision of manufacture.

A second aspect of the invention provides a fluid flow control rotary valve in addition to the first aspect of the invention, wherein the outlet port includes a plurality of outlet ports and the biasing means biases the ball bearings against the portion of the inner periphery of the frame which has largest opening area of the outlet ports.

A third aspect of the invention provides a fluid flow control rotary valve including a resinous housing which has a valve chamber with an intake port and an outlet port disposed at a longitudinally central portion on an inner periphery thereof; a metal collar which has openings at positions corresponding respectively to the ports and covers the valve chamber, which is closely fitted to the housing and has a pair of ball bearings fitted into both ends of an inner periphery thereof; a rotary shaft rotatably supported by a pair of the bearings; and a valve body carried by the rotary shaft and disposed in the valve chamber for changing opening area of the ports; and, in particular, means for biasing the ball bearings against a portion of the inner periphery of the frame member, whereby a change of a clearance between the valve body and the inner periphery of the frame member due to thermal expansion is restricted.

The above structure makes the biasing means simple and its installation easy and significantly reduce the leakage of air from a portion between the valve body and the collar even if clearance exists between the collar with the bearings fitted therein and the inner periphery of the housing.

A fourth aspect of the invention provides a fluid flow control rotary valve in addition to the third aspect of the invention, wherein the biasing means comprises resilient projections formed integrally with the collar where a pair of the bearings are fitted to bias the bearings.

Accordingly, even if the clearance due to the thermal expansion difference is formed between the outer periphery of the collar and the inner periphery of the housing, the biasing means prevents the leakage from a gap between the valve body and the collar. The resilient projection formed integrally on the collar reduces the number of parts.

A fifth aspect of the invention provides a fluid flow control rotary valve in addition to the fourth aspect of the invention, wherein the collar includes a cylindrical member having a pair of opposite ends with a space therebetween, and the opposite ends are elastically deformed and closely fitted to the inner periphery of the housing.

Accordingly, even if a clearance is formed between the housing and the collar, the collar expands and reduces the clearance between the collar and the housing.

A sixth aspect of the invention provides a fluid flow control rotary valve for driving a valve body by supplying electric current to a coil including:

a resinous housing having a valve chamber which has intake and outlet ports in a circumference thereof and accommodates the valve body and a coil chamber which accommodates the coil;

a metal collar which has openings at positions corresponding respectively to the ports and covers the valve chamber, which is closely fitted to the housing and which has a pair of ball bearings fitted into both ends of an inner periphery thereof;

a rotary shaft rotatably supported by a pair of the bearings and having a valve body disposed in the valve chamber for changing an opening area of the ports; and means for biasing the ball bearings against a portion of the inner periphery of the collar to maintain a constant clearance between the valve body and the inner periphery of the collar.

Accordingly, the resinous housing unites the coil chamber and the valve chamber, and reduces the valve weight.

Further, the biasing means biases the bearings so as to limit the clearance between the valve body and the inner periphery of the collar within a prescribed value, thereby decreasing the leakage.

A seventh aspect of the invention provides a fluid flow control rotary valve in addition to the sixth aspect of the invention, wherein the biasing means is formed on the collar and includes a resilient projection which biases the bearings against an inner periphery of the collar having the openings.

Accordingly, since the biasing means is a projection formed on the collar, it is formed integrally with the collar, thereby reducing leakage from the gap between the valve body and the collar without increasing the number of parts.

A eighth aspect of the invention provides a fluid flow control rotary valve in addition to the seventh aspect of the invention, wherein the collar comprises a cylindrical member having a pair of opposite ends with a space therebetween, and the opposite ends are elastically deformed and closely fitted to the inner periphery of the housing.

Accordingly, when a clearance is formed between the housing and the collar, the collar expands outward and prevents any increase of the clearance.

BRIEF DESCRIPTION OF THE DRAWINGS

The present invention will be understood better with reference to the drawings, in which.

DESCRIPTION OF PREFERRED EMBODIMENTS OF THE PRESENT INVENTION

An airflow-rate control valve according to a first embodiment of the present invention will be described next with reference to the appended drawings.

Figure 1:
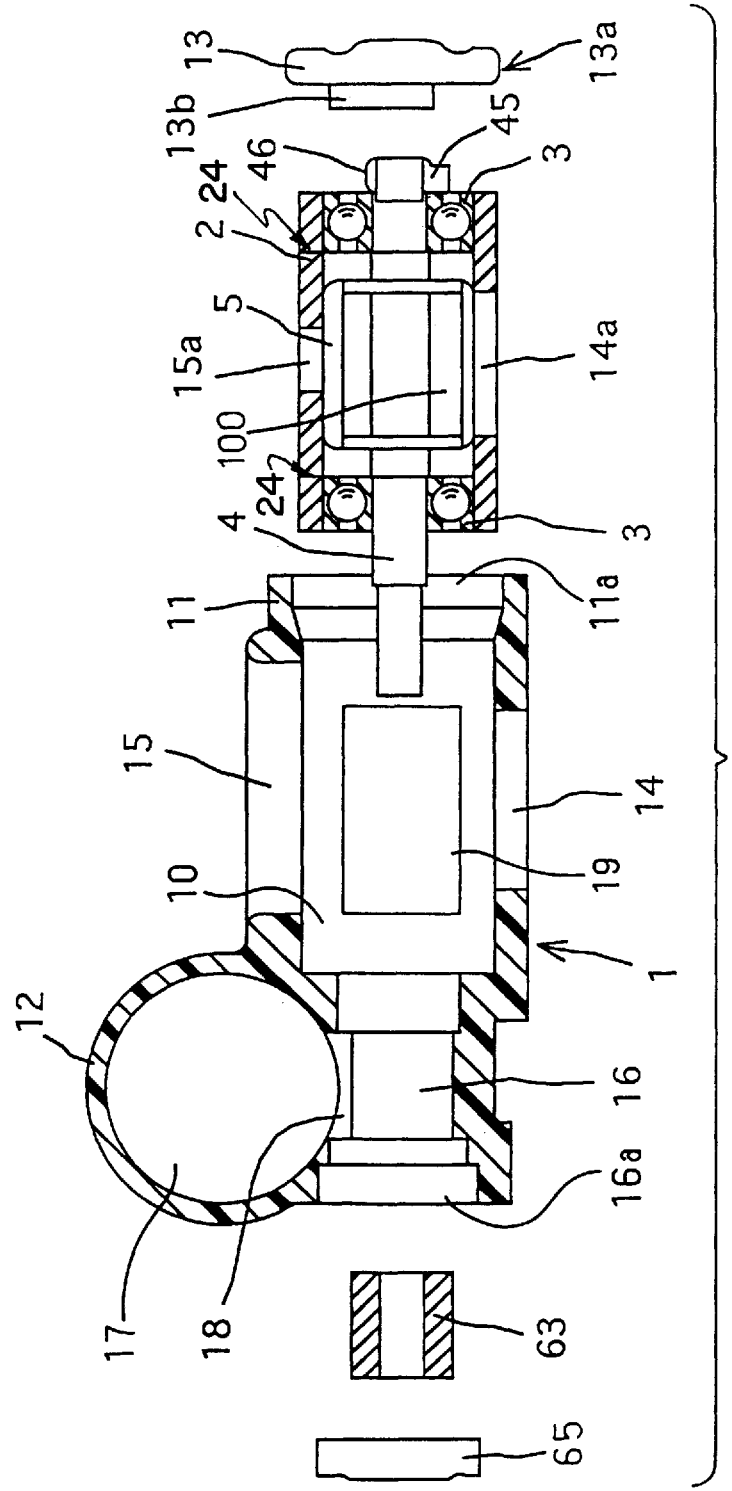
FIG. 1 is a longitudinal cross-sectional exploded view illustrating an assembly of a fluid flow control rotary valve according to an embodiment.

FIG. 1 illustrates a cross-sectional longitudinal exploded view of the airflow-rate-control valve according to one embodiment of the present invention. The airflow-rate control valve is composed of a housing 1 made of nylon mixed with glass powder. The housing 1 has a cylindrical valve housing 11 which opens at opposite ends thereof and has a space 10 for accommodating a valve therein and a solenoid housing 12 formed at an end portion of the valve housing 11. A collar 2 has a pair of ball bearings 3 disposed respectively at its opposite ends and is press-fitted into an inner periphery of the valve housing 11 at the space 10 thereof. The ball bearings 3 rotatably support a rotary shaft 4 which carries a valve body 5 between the pair of bearings 3 as described later. Reference numeral 13 is a plate which is inserted into a right side opening 11a of the valve housing 11 to close it. A cylindrical valve chamber 100 is defined by an inner periphery of the collar 2 and inner end surfaces of the bearings 3.

The valve chamber 100 connects to an external air-intake space through an intake port 19a formed in the collar 2 and an air intake port 19 (to be described later) formed in a cylindrical wall of the valve housing 11, connects to an external outlet space through an outlet port 14a formed in the collar 2 and a main outlet port 14 formed in a cylindrical wall of the valve housing 11, and connects to the outlet pipe (not shown) through an outlet port 15a formed on the collar 2 and an auxiliary outlet 15 formed in a cylindrical wall of the valve housing 11. The outlet ports 14 and 15 are opened or closed according to the rotation of the valve 5 to control the flow rate as described later.

The main outlet port 14 has a larger cross-sectional area than the auxiliary port 15.

The solenoid housing 12 has a cylindrical magnet rotor space 16 which is formed coaxially with the valve chamber 100 and has both ends open, a cylindrical coil space 17 which is disposed adjacent to an upper portion of the magnet rotor space 16 with the longitudinal axis being perpendicular to the longitudinal axis of the magnet rotor space 16 without crossing each other. The coil space 17 carries a coil 61 of a rotary solenoid (a rotary actuator in the present invention) 6 shown in FIG. 5 fitted therein and the magnet rotor space 16 accommodates a base member 62a of a yoke 62 of the rotary solenoid 6.

A permanent magnet 63 is fitted to a left end of the rotary shaft 4 and is disposed rotatably in an opening 62b formed in the base member 62a of the yoke 62 which is disposed in the magnet rotor space 16. Reference numeral 65 indicates a plate which is fitted into a left end opening 16a of the magnet rotor space 16 and closes the opening 16a.

Figure 2:
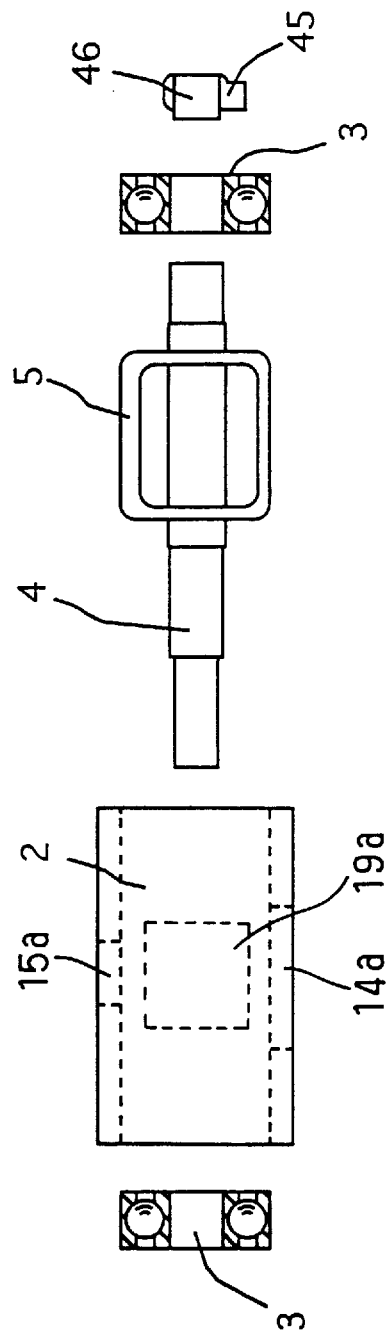
FIG. 2 is an longitudinal exploded view illustrating an assembly of rotating parts and a collar of the fluid flow control rotary valve.

FIG. 2 illustrates a longitudinally exploded view of a subassembly of the collar 2, the ball bearings 3, the rotary shaft 4 and the valve body 5. The collar 2 is made from a cylindrical thin-stainless-steel plate. The valve body 5 is secured to the inside of the collar 2 and the rotary shaft 4 is press-fitted thereto with one of the ball bearings 3 and a ring 46 thereon. After the other ball bearing 3 is press-fitted thereto, the above subassembly is completed.

Figures 3A, 3B:
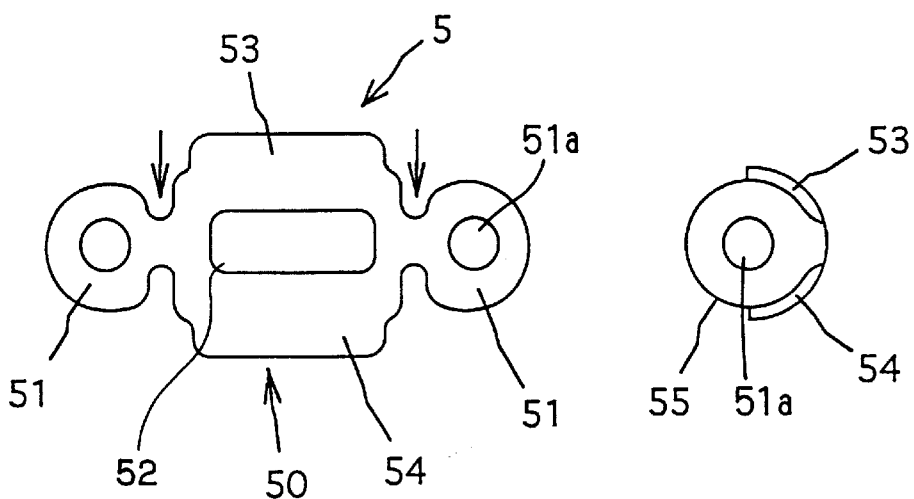
FIG. 3(a) is a spread view of a valve body before bending.
FIG. 3(b) is a front view illustrating the valve body.

FIGS. 3(a) and 3(b) illustrate a spread view of the valve body before bending.

The valve body 5 is formed from a stainless steel plate, which is stamped out to have a generally rectangular central portion 50 and annular plate members 51 on both sides of the central portion 50 before bending. The central portion 50 is bent round and the annular plate members 51 are bent at portions indicated by arrows in FIG. 3(a) to rise perpendicularly to the central portion 50 as shown in FIG. 3(b). It is thereafter fitted to the rotary shaft 4 by its holes 51a and secured thereto by welding or the like. The central portion 50 has a rectangular hole 52 and upper and lower sides thereof form first and second valve members 53 and 54 respectively.

Figure 4:
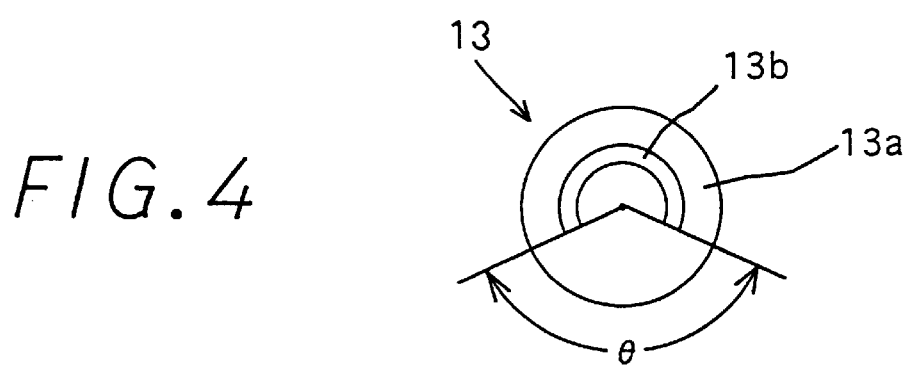
FIG. 4 is a front view illustrating a stopper.

FIG. 4 is a front view illustrating a plate 13.

The plate 13 has a disk-like base 13a and an arc-shaped stopper 13b extending longitudinally from an inner surface of the base 13a, and is fitted into a right end opening 11a of the valve housing 11 to close one end of the housing 1. The stopper 13b is disposed at the same longitudinal position as a stopper projection 45 so that a rotatable angle of the stopper projection 45 and the rotary shaft 4 is decided by an angle θ between both ends of the arc-shaped stopper 13b.

Figure 5:
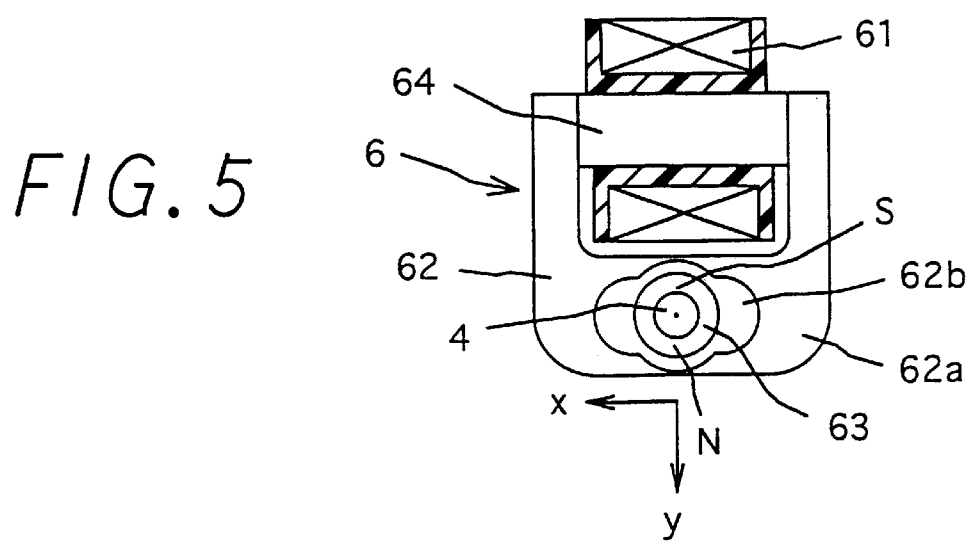
FIG. 5 is a front view illustrating the fluid flow control rotary valve.

FIG. 5 is a schematic front view illustrating the rotary solenoid 6.

When the direction and the amount of a current supplied to the coil 61 is controlled, magnetic flux flowing through a magnetic circuit which is composed of the yoke 62 and a core 64 changes, thereby changing the strength and the location of magnetic pole around the opening 62b of the base 62a. As a result, attracting or repulsing force is generated between the magnetic pole and the permanent magnet 63 carried by the rotary shaft 4 so that the permanent magnet 63 and the rotary shaft 4 rotate according to the direction and amount of the current supplied to the coil 61.

Figure 6:
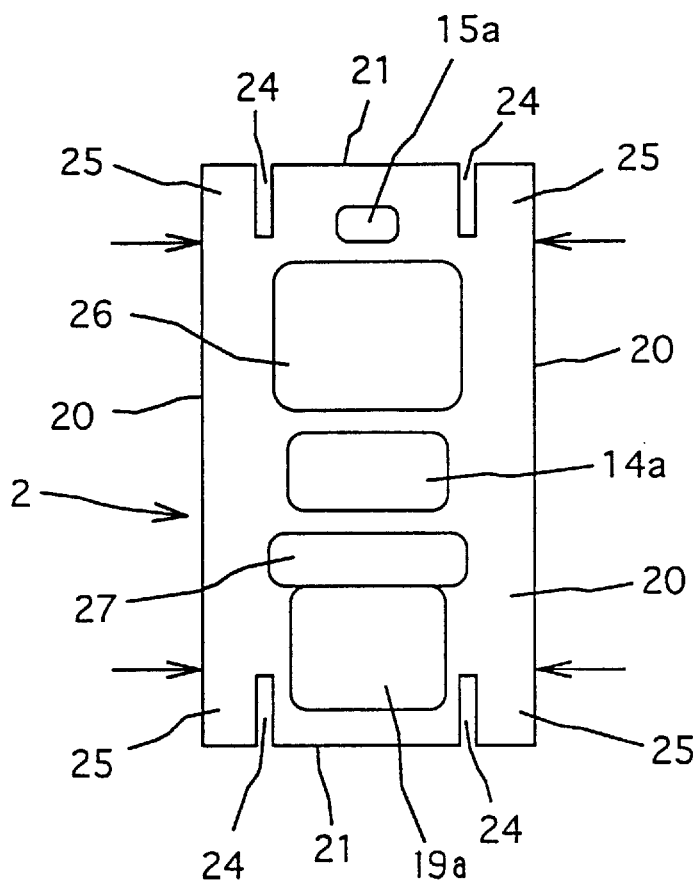
FIG. 6 is an exploded view of the collar.

FIG. 6 is an exploded view illustrating the collar 2 before bending.

The collar 2 is made of a rectangular thin plate which has a pair of longer sides 20 to be bent and a pair of shorter straight sides 21 not to be bent. Four cutouts 24 are formed at the straight sides 21 near the four corners of the collar 2 to extend in parallel with the longer side 20 to be bent, thereby forming four resilient projections 25 extending along the longer sides 20 at the respective corners.

Figure 7:
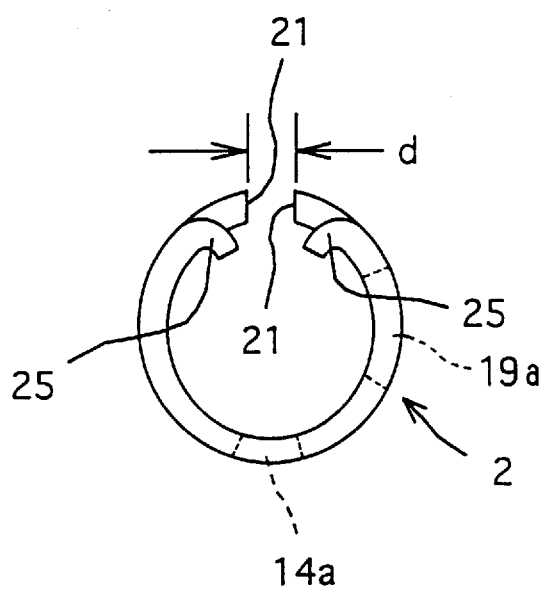
FIG. 7 is a front view illustrating the collar.

The outlet port 15a, a shallow bottomed (0.5 mm deep) concave portion 26, an outlet port 14a, a shallow bottomed (0.5 mm deep) concave portion 27 and the intake port 19a are formed in that order. The shallow concaves 26 and 27 are formed to catch foreign particles. Base portions (indicated by arrows in FIG. 6) of the resilient projections 25 are bent to a certain degree to receive one of the ball bearings 3 thereunder (as shown in FIG. 7). Other portions of the collar 2 are formed cylindrical as shown in FIG. 7 so that a gap d is formed between the straight sides 21. It is important that the outlet port 14a is located at the center of the circumference between the resilient projections 25.

In assembling, the collar 2, the ball bearings 3, the rotary shaft 4, the valve chamber 5 and the ring 46 are put together as a semi-assembly beforehand.

In this step, the resilient projections 25 of the collar 2 deform outward so that the resilient projection 25 presses the ball bearings from radially outside strongly against the bottom of the collar 2 near the outlet port 14a; to secure the ball bearings thereto firmly. Therefore, the relative location between an inner periphery of the collar 2 near the outlet port 14a and an outer periphery of the valve body 5 does not change and the clearance therebetween is kept constant even if a clearance of portions opposite the outlet port 14a between the inner periphery of the valve housing 11 and the outer periphery of the collar 2 changes due to a difference in the thermal expansion coefficients.

In other words, an increase of the clearance between the valve housing 11 and the collar 2 is absorbed by the straight sides 21 of the collar 2 having a resiliency of expanding outward, although the clearance between the valve housing made of resinous material and the collar 2 made of stainless steel increases due to difference in the thermal expansion coefficient. In addition, even if the straight sides 21 of the collar 23 expand outward, the resilient projections 25 bias the ball bearings toward the main outlet port 14 which has larger cross-sectional area than the auxiliary outlet port 15, thereby to prevent the clearance between the valve body 5 and the outlet port 14a from increasing and to decrease leakage of the valve when closing.

The collar 2 and the valve body 5 are both made of stainless steel in this embodiment. However, the resilient projections 25 can reduce the leakage from the closing valve even if both members have different thermal expansion coefficients and the clearance between the inner periphery of the collar 2 and the outer periphery of the valve body 5 increases.

Even if the clearance between the inner periphery of the collar 2 and the outer periphery of the valve body 5 exists from the beginning, the resilient projection 25 decreases the leakage from the closing valve by biasing the rotary shaft 4. As a result, the leakage can be limited within an allowable amount even if the clearance is formed a little wider.

Figure 8:
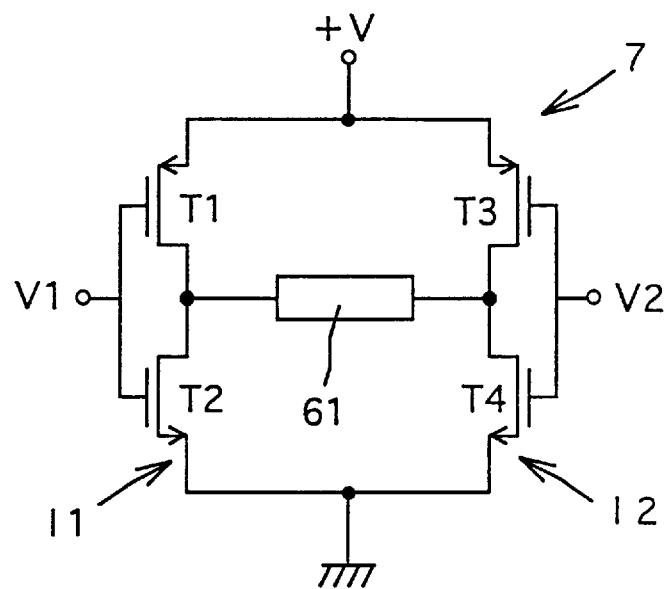
FIG. 8 is a circuit diagram of a driver circuit for driving a coil of the fluid flow control rotary valve.

A driver circuit 7 for driving the rotary solenoid 6 is illustrated in FIG. 8.

The driver circuit 7 is an AC type and is composed of an inverter I1 which has a series connection of a P-channel MOS power transistor T1 and a N-channel MOS power transistor T2, an inverter I2 which has a series connection of P-channel MOS power transistor T3 and an N-channel MOS power transistor T4 and a coil 61 of the rotary solenoid 6 which is connected across respective output terminals of the inverters I1 and I2. When the level of an input voltage V1 of the inverter I1 is high and the level of the input voltage V2 of the inverter I2 is low, electric current is supplied to the coil 61 through the transistors T3 and T2. On the other hand, when the level of the input voltage of the inverter I1 is low and the level of the input voltage of the inverter I2 is high, electric current in the opposite direction is supplied to the coil 61 through the transistor T1 and T4, as well known in the art. The electric current supplied to the coil 61 is controlled according to a duty ratio which is a ratio of the input voltages V1 and V2 whose phase is opposite to the phase of the voltage V1 in the ordinary fluid flow rate (Q min~Q max) and, consequently, the permanent magnet 63 rotates in response to the supplied current.

Further, the permanent magnet 63 stops at a position that makes the air gaps facing the N and S poles minimum as shown in FIG. 5 when the supplied current is 0. As the supplied current is gradually increased in a direction, the N and S poles of the magnet 63 are attracted or repulsed by the poles formed around the open end 62b of the yoke 62 and moves clockwise from the minimum air-gap position and stops at a position determined by the duty ratio of the supplied current. When the current is supplied from the opposite direction, the magnet rotates counterclockwise from the minimum air gap position in the same manner as above and stops at a position determined by the duty ratio of the supplied current.

Figure 11:
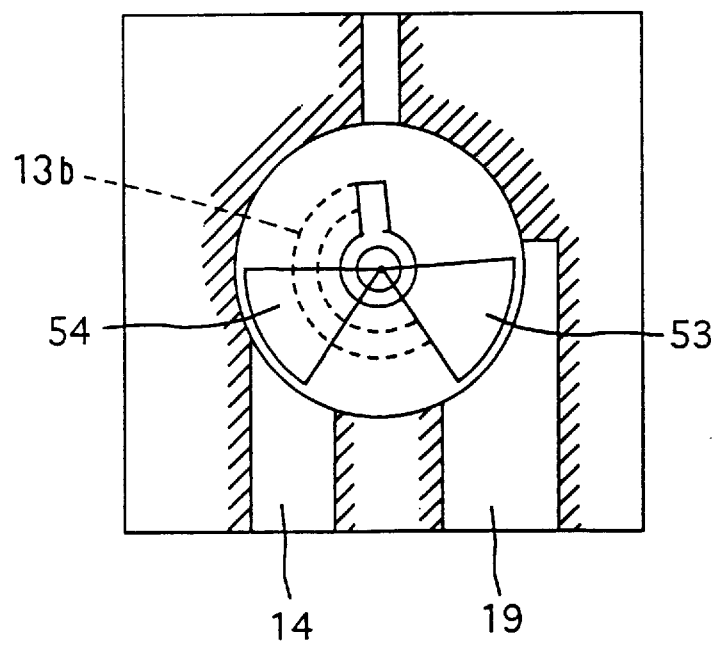
FIG. 11 is a schematic explanatory view of the fluid flow control rotary valve.
Figure 12:
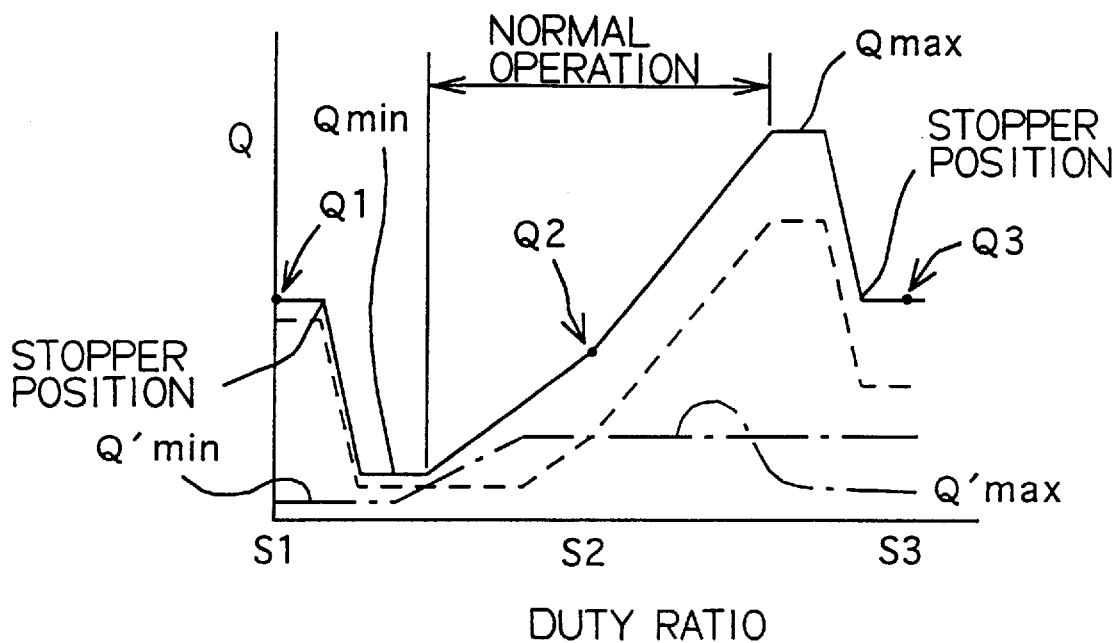
FIG. 12 is a characteristic chart showing the relationship between the duty ratio of input voltage and the amount of intake air of the fluid flow control rotary valve.
Figure 13:
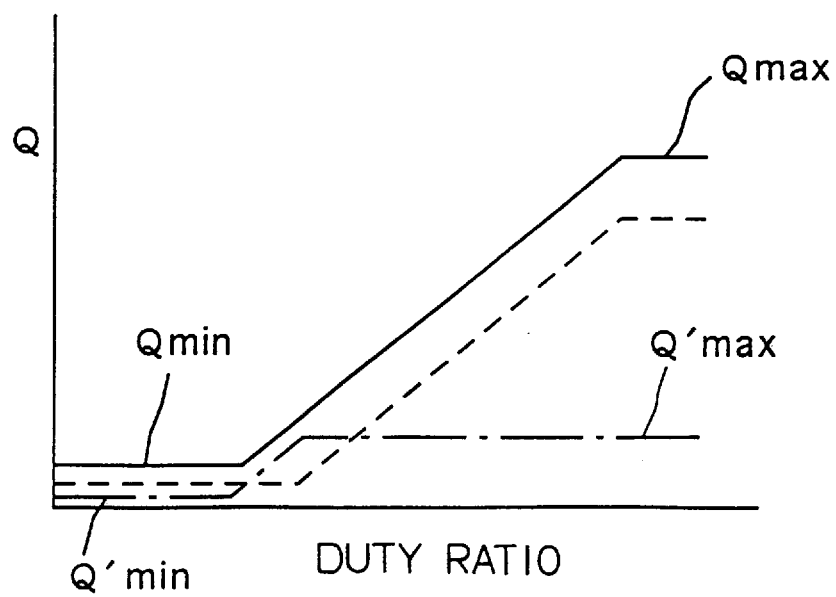
FIG. 13 is a characteristic chart showing the relationship between the duty ratio of input voltage and amount of intake air of the fluid flow control rotary valve.

Main parts of the device according to the present invention will be described with reference to FIG. 9 through FIG. 11, which illustrate radial cross-section, and FIG. 12, which shows relation between the air flow rate and the duty ratio of the input voltage. The cross-sectional view of the valve housing 11 of the housing 1 is illustrated schematically for simplicity. The valve body 5 is not illustrated in detail as in FIG. 3(b) either.

Figure 9:
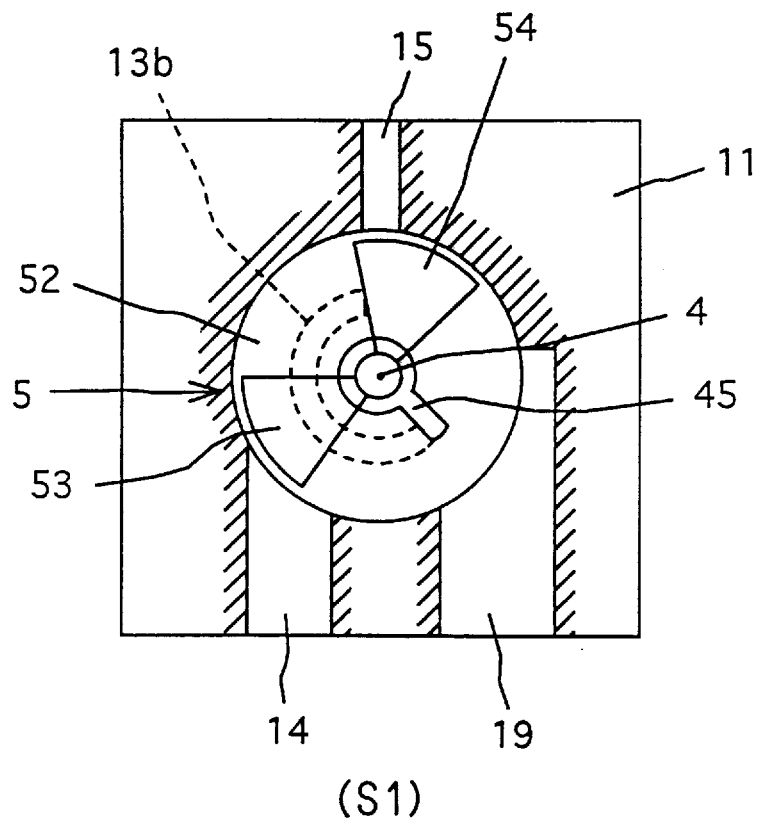
FIG. 9 is a schematic explanatory view of the fluid flow control rotary valve.

FIG. 9 shows the valve housing when the input voltage V1 of the driver circuit 7 becomes high at 100% duty ratio (on-duty ratio is 100%) and the input voltage V2 becomes low at 0% duty ratio (on-duty ratio is 0%). The stopper projection 45 abuts one of the arc-shaped stopper 13b as described before and the valve body 5 is located at a final opening position. The first valve member 53 of the valve body 5 opens a half of the main outlet port 14 to allow a medium amount Q1 of the air flow. On the other hand, the second valve member 54 of the valve body 5 fully closes the auxiliary outlet port 15 so that the air flow rate becomes a minimum amount Q' min.

Thereafter, when the on-duty ratio of the input voltage V1 of the driver circuit 7 decreases from 100% to 0% gradually and the on-duty ratio of the input voltage V2 keeps 0%( that is, the duty ratio 0%), the current flowing from the inverter I2 through the coil 61 to the inverter I1 decreases gradually from the full load current to zero finally. As a result, the valve body 5 rotates counterclockwise in FIG. 9 so that the first valve member 53 closes the main outlet port 14 gradually to decrease the air flowing therefrom to the minimum value Q min. Thereafter, the rear end of the first valve member 53 moves past the rear end A of the main outlet port 14 and opens the main outlet port 14 again to allow an amount Q2 of the air flow. The second valve member 54 begins to open the auxiliary outlet port 15, and opens it to its maximum finally. That is, the amount of the air flowing out of the auxiliary outlet port 15 increases gradually to its maximum Q' max.

Figure 10:
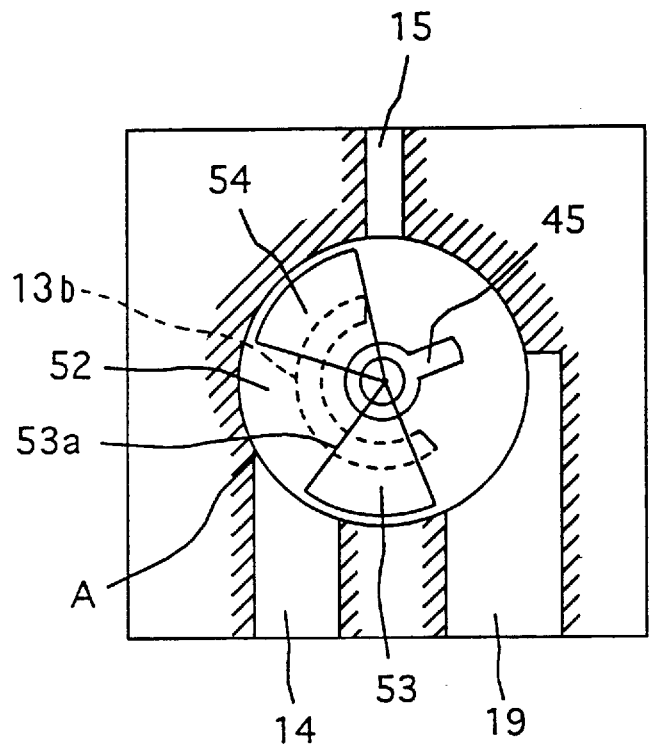
FIG. 10 is a schematic explanatory view of the fluid flow control rotary valve.

FIG. 10 illustrates the valve housing when the on-duty ratios of the input voltages V1 and V2 are 0%. That is, the current supplied to the coil 61 becomes zero. The valve body 5 is located at the initial position (medium opening position) and the amount of the air flowing from the main outlet port 14 is Q2, the air flowing from the auxiliary outlet port 15 is Q' max. Thereafter, when the on-duty ratio of the input voltage V1 of the driver circuit 7 is kept 0% and the on-duty ratio of the input voltage V2 is increased from 0% to 100% gradually, the current flowing from the inverter I1 through the coil 61 to the inverter I2 increases gradually from zero to, finally, the full load current. As a result, the valve body 5 rotates counterclockwise from the initial position (medium opening position) shown in FIG. 10 and the first valve member 53 opens the main outlet port 14 gradually to increase the air flowing out of the main outlet port 14 to the maximum Q max. Thereafter, the second valve member 54 begins to close the main outlet port 14 to decrease until the amount of the air flowing out of the main outlet port 14 becomes Q3 when the on-duty ratio of the input voltage V2 becomes 100%. At this time, the auxiliary outlet port 15 remains open.

The projection 45 abuts the other one of the arc-shaped stopper ends at about 90% on-duty ratio and the position of the valve body 5 is referred to as the final position in the present invention.

In the device according to the embodiment, the amount of the air flow becomes a medium value Q2 when the coil is not energized and it becomes either one of medium values Q1 and Q3 when the coil is fully energized in either one direction. In other words, the amount of the air flow will not become the minimum value Q min or the maximum value Q max even when trouble with the current supply such as short circuit or circuit break down takes place. Therefore, it is not possible that the engine power increases or decreases abruptly during the normal running (medium amount of the intake air).

The main outlet port 14 and the auxiliary outlet port 15 of the device according to the embodiment may be combined into one outlet port.

Variation

The resilient projection 25 is formed on the cylindrical collar 2 in this embodiment, however it may be any resilient member disposed between the ball bearing 3 and the inner periphery of the housing 1 as far as it can bias the ball bearing 3 toward the outlet port. The collar 2 may be completely cylindrical.

INDUSTRIAL APPLICABILITY

As described above, the fluid flow control rotary valve can be applied to the intake air flow rate control valve.

We claim:

1. A fluid flow control rotary valve comprising:

a resinous housing forming a valve chamber with a plurality of ports disposed at a longitudinally central portion of an inner periphery thereof;

a metal collar having openings at positions corresponding respectively to said ports and enclosing said valve chamber, said metal collar being made of a resilient plate member having a pair of opposite ends with a space formed therebetween, said opposite ends being elastically deformed so that said metal collar is press-fitted to said resinous housing due to resiliency of said metal collar, irrespective of a difference in thermal expansion between said metal collar and said housing;

a pair of ball bearings fitted into opposite ends of an inner periphery of said metal collar;

a rotary shaft rotatably supported by said pair of ball bearings;

a valve body carried by said rotary shaft and disposed in said metal collar, said valve body for changing at least an opening area of said ports; and biasing means disposed in said valve chamber, for biasing said pair of ball bearings toward a portion of said inner periphery of said housing at which one of said opening areas to be changed is disposed, said biasing means restricting a change in clearance between said valve body and said portion of said inner periphery of said housing due to thermal expansion.

2. A fluid flow control rotary valve according to claim 1, wherein:

said biasing means comprises resilient projections formed integrally with said collar where said pair of ball bearings are fitted.

3. A fluid flow control rotary valve according to claim 2, wherein:

said collar comprises a cylindrical member having a pair of opposite ends with a space formed therebetween, said opposite ends being elastically deformed and closely fitted to said inner periphery of said resinous housing.

4. A fluid flow control rotary valve for driving a valve body by supplying electric current to a coil, said fluid flow control valve comprising:

a resinous housing forming a valve chamber having circumferentially formed intake and outlet ports, said resinous housing accommodating said valve body and having a coil chamber which accommodates said coil;

a metal collar having openings at positions corresponding respectively to said intake and outlet ports and covering said valve chamber, said metal collar being made of a resilient plate member having a pair of opposite ends with a space formed therebetween, said opposite ends being elastically deformed so that said metal collar is press-fitted to said resinous housing due to resiliency of said metal collar, irrespective of a difference in thermal expansion between said metal collar and said housing;

a pair of ball bearings fitted into opposite ends of an inner periphery of said metal collar;

a rotary shaft rotatably supported by said pair of ball bearings;

a valve body on said rotary shaft and disposed in said metal collar, said valve body for changing at least an opening area of said inlet and outlet ports; and biasing means disposed in said valve chamber, for biasing said pair of ball bearings toward a portion of said inner periphery of said metal collar at which a said opening area to be changed is disposed to restrict a change in clearance between said valve body and said portion of said inner periphery of said collar.

5. A fluid flow control rotary valve according to claim 4, wherein:

said biasing means comprises a resilient project integral with said metal collar.

6. A fluid flow control rotary valve according to claim 4, wherein said metal collar comprises:

a cylindrical member having a pair of opposite ends with a space formed therebetween, said opposite ends being elastically deformed and closely fitted to an inner periphery of said resinous housing thereby forming said biasing means.

* * * * *